United States Patent
Mori et al.

(10) Patent No.: US 9,783,134 B2
(45) Date of Patent: Oct. 10, 2017

(54) FASTENING ARRANGEMENT FOR POSITIONING AND FASTENING A DECORATIVE COVER ON A WINDOW FRAME OF A VEHICLE DOOR OF A VEHICLE

(71) Applicant: GM GLOBAL TECHNOLOGY OPERATIONS LLC, Detroit, MI (US)

(72) Inventors: Erol Mori, Ruesselsheim (DE); Michael Alhof, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/131,519

(22) Filed: Apr. 18, 2016

(65) Prior Publication Data

US 2016/0303959 A1 Oct. 20, 2016

(30) Foreign Application Priority Data

Apr. 18, 2015 (DE) .................. 10 2015 004 982

(51) Int. Cl.
*B60R 13/04* (2006.01)
*B60J 10/76* (2016.01)

(52) U.S. Cl.
CPC .............. *B60R 13/04* (2013.01); *B60J 10/76* (2016.02)

(58) Field of Classification Search
CPC ........... B60R 13/04; B60J 10/76; B60J 10/36
USPC ..................................... 296/146.1
See application file for complete search history.

(56) References Cited

U.S. PATENT DOCUMENTS

| | | |
|---|---|---|
| 5,092,078 A | 3/1992 | Keys |
| 5,353,571 A | 10/1994 | Berdan et al. |
| 6,416,113 B1 | 7/2002 | Page |
| 8,356,851 B2 | 1/2013 | Lange |
| 2011/0148150 A1 | 6/2011 | Gerndorf et al. |
| 2011/0296764 A1 | 12/2011 | Sawatani et al. |
| 2012/0110918 A1 | 5/2012 | Love |
| 2012/0137628 A1* | 6/2012 | Brandt ................. B60R 13/04 52/716.5 |
| 2013/0292965 A1 | 11/2013 | Prater et al. |
| 2014/0312648 A1* | 10/2014 | Wade ............... B29C 45/14467 296/146.2 |

FOREIGN PATENT DOCUMENTS

| | | |
|---|---|---|
| DE | 4342758 A1 | 6/1995 |
| JP | 2001355614 A | 12/2001 |
| JP | 2013116680 A | 6/2013 |
| WO | 2013034308 A1 | 3/2013 |
| WO | 2013125015 A1 | 8/2013 |

OTHER PUBLICATIONS

Great Britain Patent Office, Great Britain Search Report for Great Britain Application No. 1605839.8, dated Aug. 26, 2016.
German Patent Office, German Search Report for German Application No. DE102015004982.8, dated Feb. 18, 2016.

* cited by examiner

*Primary Examiner* — Pinel Romain
(74) *Attorney, Agent, or Firm* — Lorenz & Kopf LLP

(57) ABSTRACT

A fastening arrangement is provided for positioning and fastening a decorative cover on a window frame of a vehicle door of a vehicle. The fastening arrangement has a first fastening element associated with the window frame and a second fastening element associated with the decorative cover. The first and second fastening elements cooperate in a form-fitting manner for fastening the decorative cover on the window frame.

12 Claims, 5 Drawing Sheets

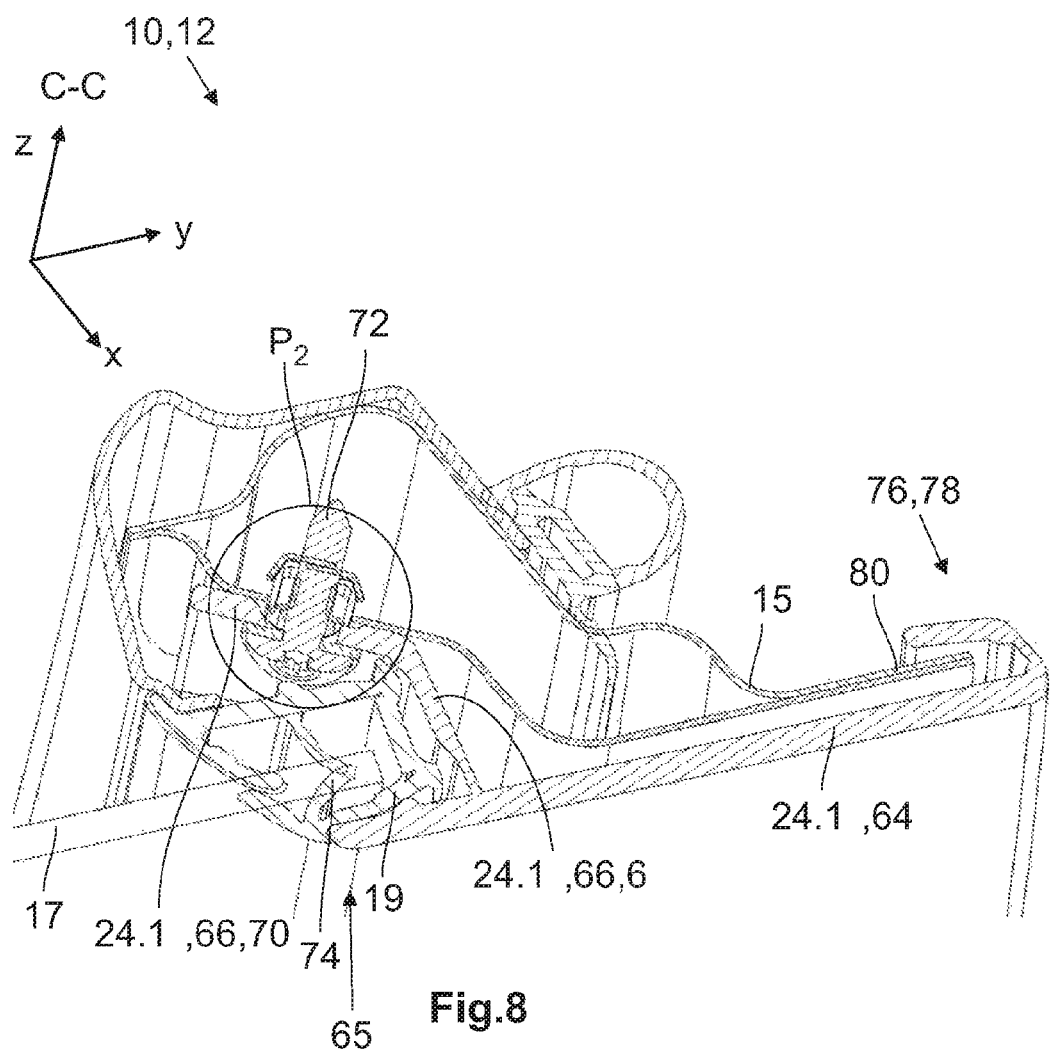

FASTENING ARRANGEMENT FOR POSITIONING AND FASTENING A DECORATIVE COVER ON A WINDOW FRAME OF A VEHICLE DOOR OF A VEHICLE

CROSS-REFERENCE TO RELATED APPLICATION

This application claims priority to German Patent Application No. 102015004982.8, filed Apr. 18, 2015, which is incorporated herein by reference in its entirety.

TECHNICAL FIELD

The present disclosure pertains to a fastening arrangement for positioning and fastening a decorative cover on a window frame of a vehicle door of a vehicle.

BACKGROUND

Vehicle doors installed in vehicles have in many cases a multi-part window frame, which forms a support structure for receiving a vertically displaceable glass pane (drop window). Vehicle doors with a closed window frame can be manufactured substantially in two construction types. A conventional construction type is the two-shell system, in which the glass pane is arranged between two sheet metal parts forming the window frame and is guided within a U-shaped channel. The outer side of the vehicle frame is formed by the corresponding sheet metal part. Another conventional, more modern construction type is the so-called "frame under glass concept", in which the upper part of the vehicle frame is typically embodied in two parts and provides the mount for a U-shaped channel. This U-shaped channel is usually formed by a plastic part, for example by a decorative cover. The U-shaped channel receives at the same time a sealing part, which seals and guides the glass pane. Consequently, in contrast to the conventional two-shell system, the outer side of the vehicle door is formed by a plastic part in the region of the B-pillar of the window frame.

Irrespective of the construction type used, the vehicle door which is mounted on the vehicle body, for example a side door of the vehicle, includes a planar base section, on the upper side of which a window frame is formed. Here, the window frame surrounds an opening which serves to receive the vertically displaceable glass pane. The window frame includes a front, approximately vertically running vertical strut, a rear, likewise approximately vertical strut and an upper transverse strut connecting the two vertical struts to one another. In the installed state, the rear vertical strut of the front side door and the front vertical strut of the rear side door typically extend along a support pillar, in particular center pillar (B-pillar), of the vehicle body. In the frame under glass concept, it is usual to mount the decorative cover in the region of the vertical struts, in order to give an attractive appearance to the vehicle door, in addition to receiving the sealing part.

Usually, decorative covers are fastened at three fastening points on the window frame. All three fastening points may be arranged in the region of the U-shaped channel. Alternately, a first fastening point is provided at the upper end of the window frame and two fastening points in the channel region. In this way, the decorative cover can advantageously be positioned at the upper end very precisely and largely free of play in particular in relation to adjacent components, which leads to a qualitatively high-grade aesthetic impression.

DE 10 2010 050 959 A1 discloses a type of fastening of the decorative cover in the region of the guide and the seal of the glass pane is described. Here, the decorative cover has a formed-on screw boss or an insert part such as a sheet metal nut, which cooperate with a screw which is screwed from the inner side of the vehicle into the formed-on screw boss or the insert part. In the case of the formed-on screw boss, the screw which is used is usually self-tapping.

DE 10 2009 026 070 A1 discloses a possibility for fastening the decorative cover in the region of the guide and the seal of the glass pane is also described. Here, the decorative cover has a U-shaped holding cross-piece, into which a projection of the window frame must be introduced. The decorative cover is then turned until the decorative cover lies flat against the window frame. The decorative cover is then fastened to the window frame by means of a plug-in spreader element. The spreader element can already be introduced into the decorative strip before the actual fastening process, so that during the fastening process it is already pre-positioned, which is advantageous from a logistical point of view. In addition, during the mounting, the spreader element does not have to be positioned and does not have to be screwed, but rather it only needs to be pressed in, so that no screwdriver is necessary, which is an advantage with regard to production.

In both cases, the screws of the fastening points, arranged in the channel region, project into cavities which are formed by the window frame. In the second embodiment, however, the following circumstance is to be taken into consideration: In the transition of the window frame from the hollow struts into the transverse strut, the window frame does not form a cavity into which a screw could project. Consequently, the decorative cover in this region is fastened up to now by a screw originating from the inner side of the window frame, the screw head of which is visible from the interior of the vehicle, which, however, does not make a positive impression from an aesthetic and qualitative point of view and, in addition, makes a screwing-in process necessary, which is time-intensive.

SUMMARY

In accordance with the present disclosure a fastening arrangement enables a simple mounting and, at the same time, a simple and accurate positioning of the decorative cover, from a production-oriented point of view, in relation to window frames. In addition, the fastening elements which are used are to be as little visible as possible from the interior of the vehicle.

According to an example embodiment of the fastening arrangement for positioning and fastening a decorative cover on a window frame of a vehicle door of a vehicle, the fastening arrangement has a first fastening element, associated with the window frame, and a second fastening element, associated with the decorative cover, which cooperate in a form-fitting manner for fastening the decorative cover to the window frame. The use of the designation "associated" is not to be understood here to mean that the respective fastening element has to be directly connected with the reference component, or is even an integral component part of the reference component. This designation serves only for clarification of the spatial arrangement of the respective fastening elements in the installed state. The form-fitting operative connection can be provided by means of the shaping of the fastening elements, so that no additional fastening elements, such as screws, are required, which could be intrusive from an aesthetic point of view. In addition, the form-fitting operative connection can be provided without a tool, whereby the fastening of the decorative cover on the window frame is facilitated and the assembly time is reduced.

It suggests itself that the fastening arrangement is constructed so that the first and the second fastening element are able to be brought into engagement in a form-fitting manner by a single translational movement. Hereby, also, the manufacture is simplified, because no complex movement- and assembly sequences have to be followed. Consequently, it is possible to mount the decorative cover within a shorter time than in known fastening arrangements. It is advantageous here if the fastening elements are aligned so that the single translational movement is carried out along the longitudinal axes defined by the fastening elements. The longitudinal axes run approximately perpendicularly to the outwardly-pointing surface of the window frame. In this case, the decorative cover can be pressed directly onto the first fastening element, which enables a distinct simplification and acceleration of the assembly.

In a further configuration of the fastening arrangement, the first fastening element has flexible projections which, in the assembled state, cooperate in a form-fitting manner with the second fastening element. With the flexible projections, a clip- or detent connection is realized, which has the advantage that the fitter is given a clear confirmation when the decorative cover is installed correctly. Hereby, the installation reliability is increased. Another configuration can be embodied such that the flexible projections are arranged on the second fastening element, which is associated with the decorative cover, which then engage in a form-fitting manner into the first fastening element. The technical effects are the same as in the contrary arrangement of the flexible projections.

It is expedient if the projections have first stop surfaces, which cooperate with second stop surfaces of the second fastening element for the positioning of the decorative cover on the window frame. Hereby, the position of the decorative cover in relation to the window frame is established at least along the normal of the stop surfaces, an that during assembly no time-intensive positioning work has to be carried out. A particular point here is that the stop surfaces lie on the projections, so that no further positioning elements such as bolts or similar have to be provided, whereby the complexity of the shaping of the fastening elements is reduced. In addition, a slipping of the decorative cover in the operation of the vehicle is also prevented.

A further embodiment is distinguished in that the projections have first effective surfaces, which in the assembled state cooperate with second effective surfaces of the second fastening element, wherein the effective surfaces are inclined with respect to a plane running perpendicularly to the longitudinal axis of the first or respectively of the second fastening element. The inclination of the two effective surfaces has the effect that in a similar manner to in a keyed joint a movement is blocked at least along one direction in the plane. Therefore, it can be prevented that the decorative cover can detach itself from the window frame during the operation of the vehicle.

It is an essential point of the present disclosure that the first and the second fastening element can be constructed so that they are not only able to fasten the decorative cover on the window frame, but also to position it very accurately without appreciable additional work. It is consequently not necessary to resort to further measures, in order to establish the position of the decorative cover on the window frame. This aspect can be achieved with the fastening arrangement according to the present disclosure that no screws are necessary for fixing the decorative cover on the upper region of the window frame. The use of the screw has the advantage that with the clamping force applied by the screw a precise positioning of the decorative cover and of the adjoining components in particular in transverse direction of the vehicle in relation to the window frame can be achieved. On omission of the screw, the positioning of the decorative cover on the window frame must be achieved by the fastening arrangement, which can be realized with the desired accuracy with the previously mentioned effective- and stop surfaces. The precise positioning is important in particular because even the smallest irregularities in the gap course to adjacent components, for example a bright strip, are immediately conspicuous and provide for a reduced qualitative impression. According to the present disclosure, the decorative cover can also be positioned sufficiently precisely without the use of a screw. A further point is that at high vehicle speeds, relatively great aerodynamic pressures and forces act on the side door and the glass pane (drop window). The fastening arrangement is designed on that these pressures and forces do not lead to a loss of position and/or function of the decorative cover.

In a further development of the fastening arrangement, the first fastening element has first positioning surfaces, which cooperate with second positioning surfaces of the second fastening element for positioning the decorative cover on the window frame. The positioning surfaces are preferably inclined along a plane running through the longitudinal axis of the first and of the second fastening element. The positioning surfaces simplify the assembly in that they bring the two fastening elements increasingly further into the fastening position, the further they are moved towards one another. Fastening position is to be understood to mean the position of the two fastening elements with respect to one another, which they must assume so that the decorative cover can be fastened to the window frame. At the start of the assembly, the decorative cover therefore only has to be positioned relatively roughly on the window frame, which is advantageous in particular when the fastening elements are concealed by the decorative cover from the sight of the fitter.

It is expedient to configure the first fastening element such that it is able to be pre-positioned on the window frame. The first fastening element can be pre-positioned on the window frame for example by means of a projection or a lug, until the first fastening element is finally positioned and fastened with a sealing part, which is pushed onto the window frame in a frictionally engaged manner. This sealing part can also bring about the guiding and sealing of the glass pane. The structural measures which are to be carried out on the window frame itself for pre-positioning the first fastening element can be kept minor. In addition, the plastic part can also have projections and recesses, which cooperate with the first fastening element, so that the first fastening element is finally positioned. Structurally complex fixing elements taking up a large installation space, for fixing the fastening element on the window frame are not necessary.

Usually, the window frame of a vehicle door is made from metal, whereas the first and/or the second fastening element can be made from a plastic or from a plastic/elastomer composite, whereby one is distinctly more flexible in the choice of material. It has been found to be particularly favorable if the first and/or the second fastening element are produced entirely or partially from polyamide (PA). Polyamides can be mixed well with glass fibers, whereby the required component strength can be adjusted. Hereby, so-called glass fiber-reinforced polyamides (PA-GF) are produced. In addition, polyamides have a softening temperature which lies higher than the injection temperature for example of elastomers such as ethylene propylene diene monomer (EPDM) or thermoplastic elastomers (TPE). The elastomers can also be used as materials for the first and/or second fastening element. Further materials which can be used for the first and/or the second fastening element include acrylic ester-styrene-acrylonitrile (ASA) or acrylonitrile-butadiene-styrene/polymethyl methacrylate (ABS-PMMA).

A continuation of the fastening arrangement is distinguished in that the second fastening element is formed by the decorative cover. In contrast to the window frame, a plastic, for example, but not exclusively, acrylic ester-styrene-acrylonitrile (ASA) or acrylonitrile-butadiene-styrene/polymethyl methacrylate (ABS/PMMA), for example coextruded, presents itself as material for the first and/or the second fastening element and for the decorative cover. In addition, elastomer materials can also be used. As relatively complex geometries can also be produced in a simple manner with a plastic, it is expedient to construct the second fastening element integrally with the decorative cover. Through the reduction of the number of components, the logistical effort can be reduced. Likewise, it is conceivable to configure the second fastening element so that it can be produced by the "In-Mold Decoration Method" (MD) or by the "In-Mold Coating Method" (IMC). Basically, the first fastening element can also be produced with these materials and by this method.

In a further development of the fastening arrangement according to the present disclosure, the second fastening element is arranged on the side of the decorative cover pointing towards the window frame in the assembled state. The decorative cover itself therefore conceals the second fastening element in the assembled state, so that it is not visible from the exterior. In addition, the entire fastening arrangement is concealed by the decorative cover and is inaccessible in the assembled state, so that the decorative cover can only be detached from the window frame again with considerable effort. Hereby, it is prevented that unauthorized persons can detach the decorative cover from the vehicle.

In accordance with the present disclosure, a vehicle door for a vehicle is also provided, which door has a fastening arrangement according to one of the previously described example embodiments. The technical effects and advantages which can be achieved with the vehicle door according to the present disclosure correspond to those which have been described for the respective example embodiments of the fastening arrangement. In summary, and not exclusively, the simplified assembly of the decorative cover is to be mentioned, without the fastening elements which are used being visible. In addition, the possibility is provided to realize the positioning and the fastening with the two fastening elements and without additional positioning elements.

It is expedient here to configure the vehicle door as front side door of the vehicle. A plurality of vehicles has a center pillar, the so-called B-pillar, which is frequently relatively wide in particular with regard to as high a torsional stiffness of the body as possible and a high occupant protection. The rear vertical strut of the window frame of the front vehicle door runs along the center pillar, so that the rear vertical strut us usually also distinctly wider than the other struts of the window frame. Consequently, in this case, a covering of the frame profile in the rear vertical strut is particularly effective. However, the applicability of the present disclosure is in no way restricted to the front side door of the vehicle. Basically, all vehicle doors which have a frame under glass (FUG) structure with a lowerable glass pane can be equipped with a decorative cover, which is fastened by the fastening arrangement according to the present disclosure. In particular, the vertical struts of the side doors, running substantially vertically in the installed state, can be equipped with the decorative covers.

The problem is solved in addition by a vehicle which has a vehicle door according to one of the previously described example embodiments. The technical effects and advantages which can be achieved by the vehicle door according to the present disclosure correspond to those which have been described for the respective example embodiments of the vehicle door and of the fastening arrangement.

BRIEF DESCRIPTION OF THE DRAWINGS

The present disclosure will hereinafter be described in conjunction with the following drawing figures, wherein like numerals denote like elements.

FIG. 8 shows a perspective sectional illustration along the section plane C-C defined in FIG. 4.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1A:
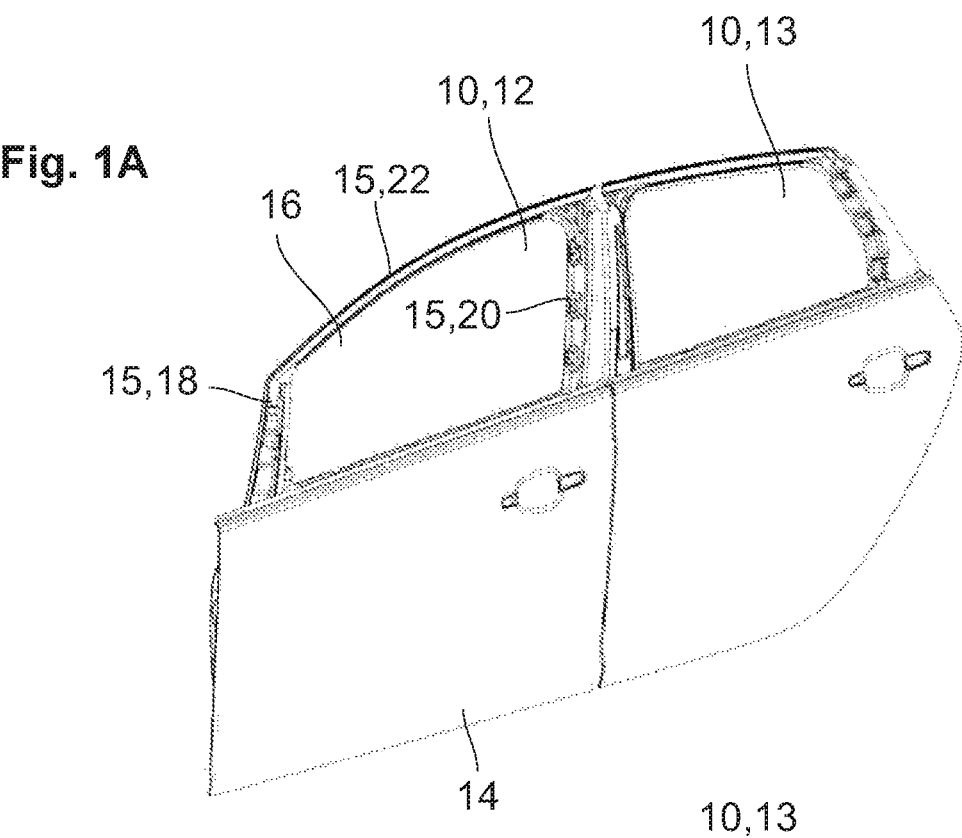
FIG. 1A shows a diagrammatic perspective illustration of two conventional vehicle doors in shell construction.
Figure 1B:
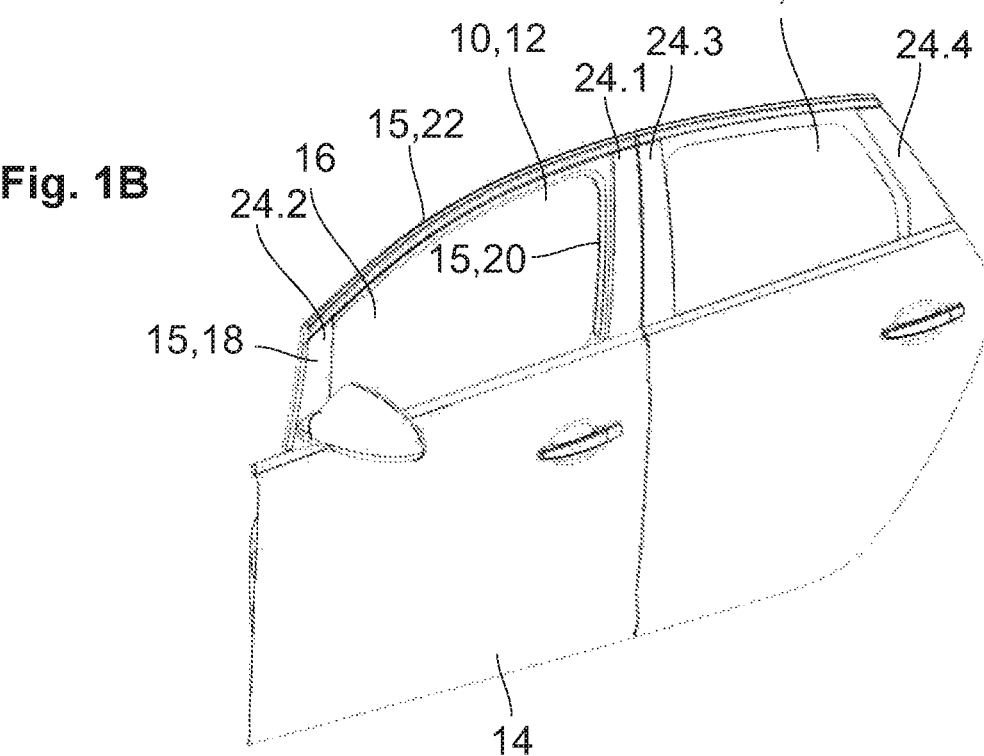
FIG. 1B shows the vehicle doors illustrated in FIG. 1A, in finished state.

In FIG. 1A left vehicle doors 10, here a left front side door 12 and a left rear side door 13 are illustrated by way of example in shell construction and in FIG. 1B in the finished state. The left front side door 12, mounted on the vehicle body of a vehicle which is not illustrated, includes a planar base section 14, on the upper side of which a window frame 15 is formed. The window frame 15 surrounds an opening 16 here, which serves to receive a vertically displaceable glass pane 17 (cf, FIG. 8). The window frame 15 includes a front vertical strut 18, a rear vertical strut 20 and an upper transverse strut 22 connecting these to one another. When the front side door 12 is installed on the vehicle, the rear vertical strut 20 extends typically along a support pillar, in particular a center pillar (B-pillar) of the vehicle body. Accordingly, a front vertical strut of the rear side door 13 likewise runs along the center pillar of the vehicle body.

In the further installation of the side doors, a sealing part 19 is inserted in a frictionally engaged manner into a first decorative cover 24 (cf. FIG. 8), is guided with the glass pane 17 and is sealed. The first decorative cover 24.1 serves, in addition to receiving the sealing part 19, also for covering the window frame 15 or respectively the sealing part 19 in the region of the rear vertical strut 20. In the region of the front vertical strut 18 a second decorative cover 24.2 is provided. Accordingly, on the front vertical strut of the rear side door 13 a third decorative cover 24.3 and on the rear vertical strut a fourth decorative cover 24.4 is provided.

Figure 2:
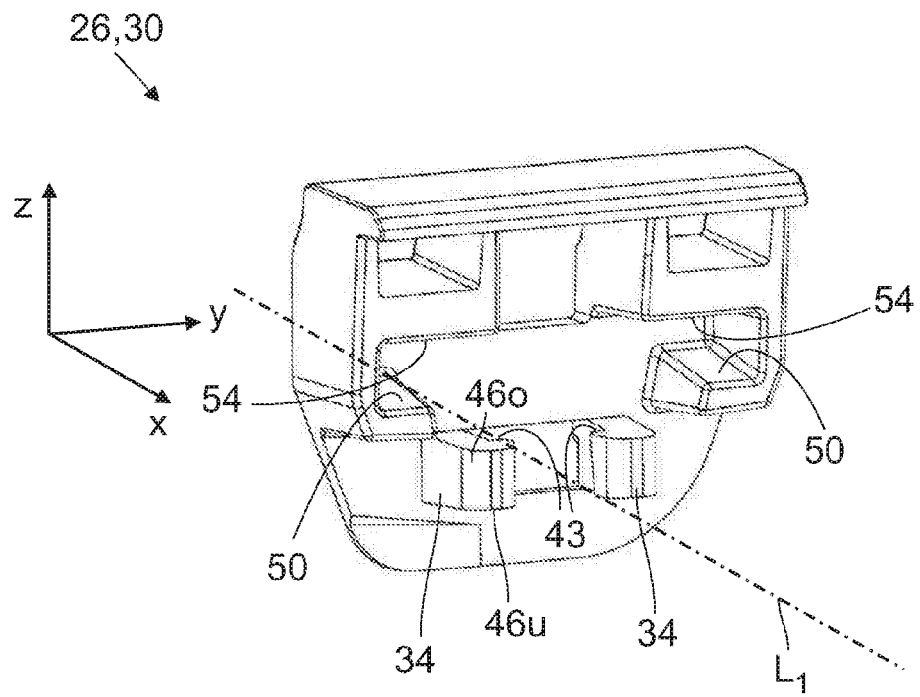
FIG. 2 shows a perspective illustration of a first fastening element of a fastening arrangement according to the present disclosure.
Figure 3:
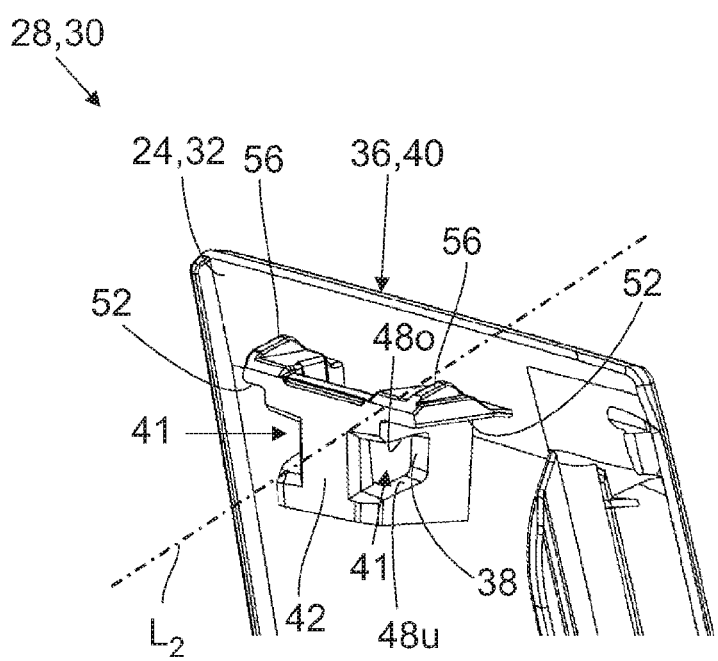
FIG. 3 shows a perspective illustration of a second fastening element, which is arranged on a decorative cover.

In FIG. 2 a first fastening element 26 is shown, and in FIG. 3 a second fastening element 28, respectively with the aid of a perspective illustration, which together form an embodiment of the fastening arrangement 30 according to the present disclosure for positioning and fastening the decorative cover 24 on the window frame 15 of the vehicle door 10 of a vehicle. The second fastening element 28 is arranged on a side 32 of the decorative cover 24 pointing towards the vehicle in the installed state and is embodied as an integral component of the decorative cover 24.

For the following description, it is to be assumed that the first and the second fastening element 26, 28, on installation, are aligned so that their longitudinal axes $L_1$, $L_2$ run parallel to the x-axis defined in FIG. 2.

Figure 5:
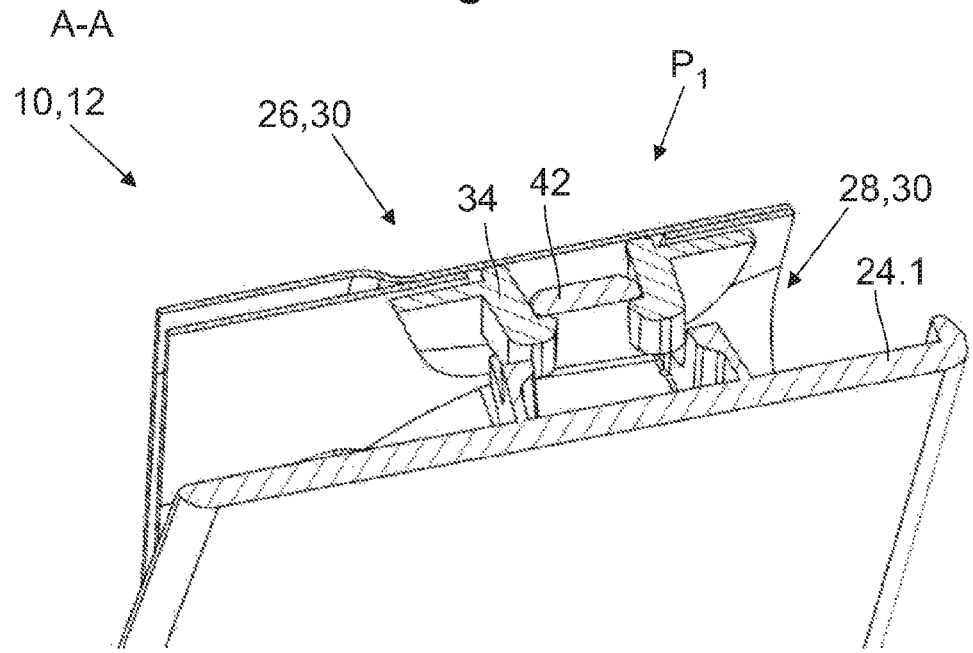
FIG. 5 shows a perspective sectional illustration along the section plane A-A defined in FIG. 4.
Figure 6:
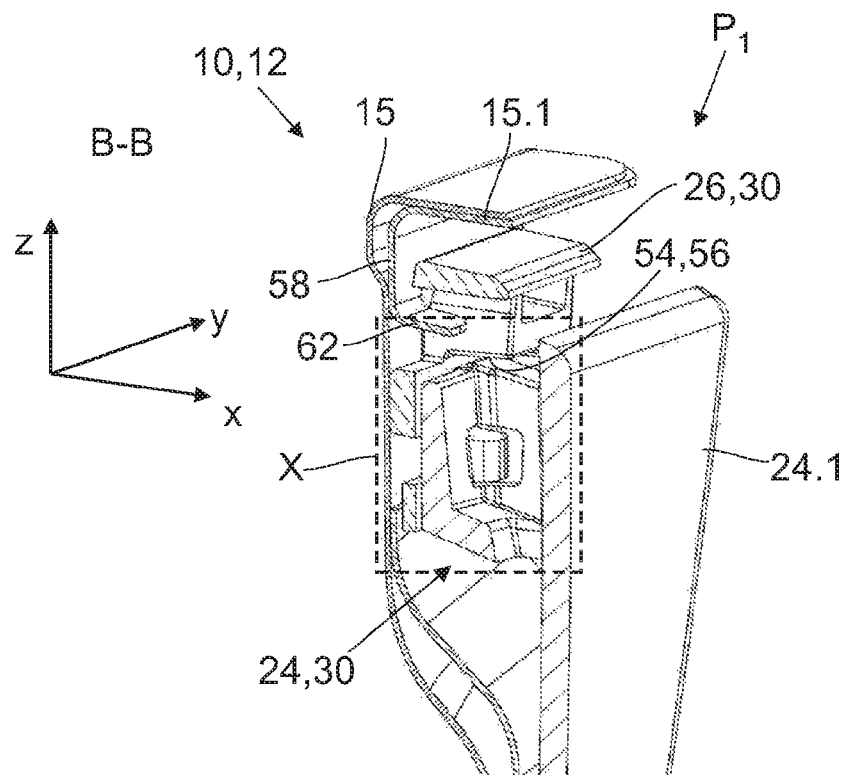
FIG. 6 shows a perspective sectional illustration along the section plane B-B defined in FIG. 4.
Figure 7:
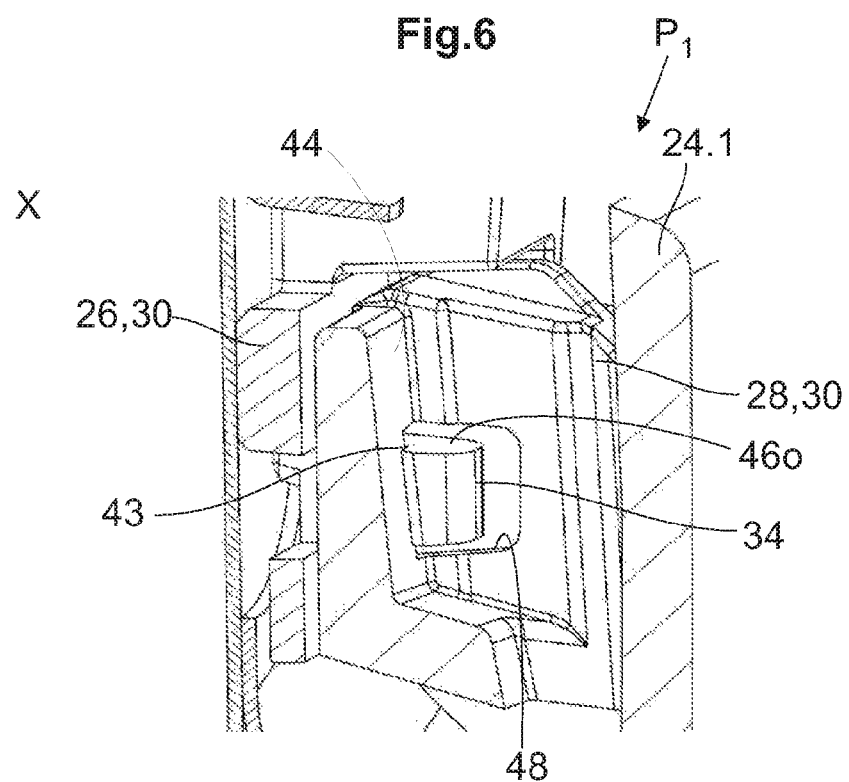
FIG. 7 shows an enlarged illustration of the portion X marked in FIG. 6.

The first fastening element 26 has two flexible projections 34, which have an L-shaped detent geometry and in the installed state of the decorative cover 24 cooperate in a form-fitting manner with the second fastening element 28 (see FIGS. 5 to 7). For this, the second fastening element 28 has a substantially cuboid-shaped base body 36 with a wall 38, which surrounds a cavity 40. The wall 38 has two apertures 41, so that a cross-piece 42 is formed.

Moreover, the projections 34 have first effective surfaces 43, which during installation and in the installed state cooperate with second effective surfaces 44 of the second fastening element 28 (see FIG. 7) The first and the second effective surfaces 43, 44 are inclined with respect to the y-z plane formed by the y-axis and the z-axis.

Furthermore, the projections 34 have first stop surfaces 46, which can cooperate with second stop surfaces 48 of the second fastening element 28 for positioning the decorative cover 24 on the window frame 15. In the illustrated example, the projections 34 include respectively an upper first stop surface 46o and a lower first stop surface 46u, wherein the lower first stop surface 46u is inclined with respect to the x-y plane formed by the x-axis and the y-axis, whilst the upper first stop surface 46o runs substantially parallel to the x-y plane. Accordingly, the second fastening element 28 has an upper second stop surface 48o and a lower second stop surface 48u, wherein the lower second stop surface 48u is inclined in a corresponding manner to the lower first stop surface 46u. As can be seen from FIG. 7, the projections 34 are, however, configured in the illustrated example embodiment so that the first and the second stop surfaces 46, 48 do not cooperate in the assembled state. Consequently, the projections 34 in the illustrated example embodiment do not serve primarily for the positioning of the decorative cover 24 in z-direction, but rather principally for the fixing of the decorative cover 24 on the sealing part 19.

In addition, the first fastening element 26 includes two first positioning surfaces 50 which, for positioning the decorative cover 24 on the window frame 15, cooperate with second positioning surfaces 52 arranged on the second fastening element 28. In the illustrated example, the first positioning surfaces 50 are inclined with respect to the x-y plane, whilst the second positioning surfaces 52 cooperating with the first positioning surfaces 50 are not inclined with respect to the x-y plane. However, the first fastening element 26 has first counter surfaces 54, which lie opposite the first positioning surfaces 50 in the direction of the z-axis. The first counter surfaces 54 cooperate with second counter surfaces 56 arranged on the second fastening element 28, which in this case are inclined with respect to the x-y plane.

Figure 4:
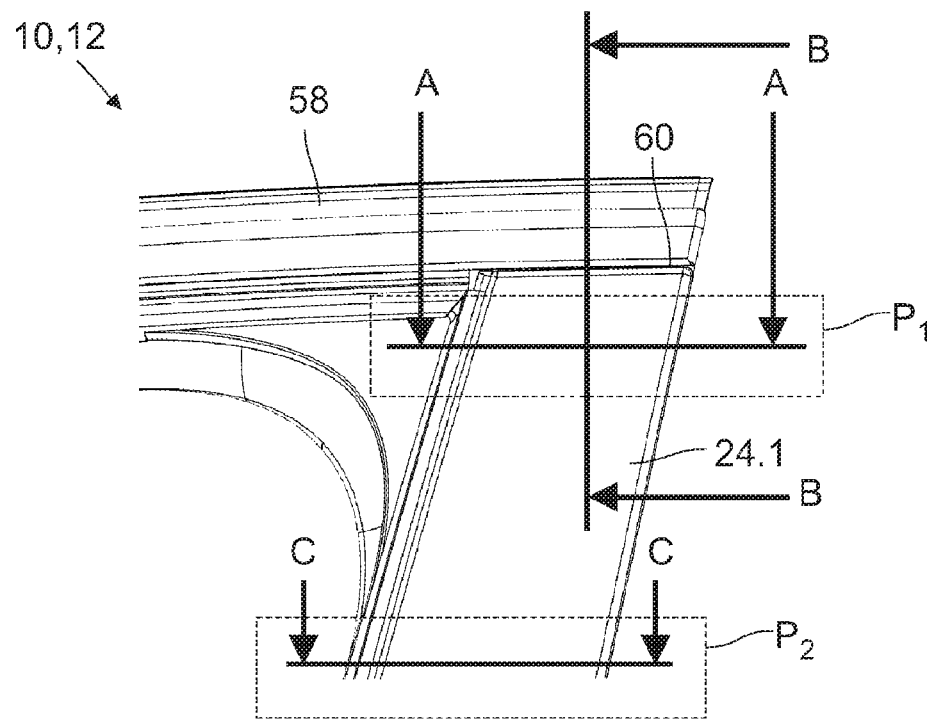
FIG. 4 shows a perspective illustration of a cut-out of a vehicle door.

In FIG. 4 a cut-out of a vehicle door 10 of a vehicle, which is not illustrated, is shown, which is provided with the decorative cover 24 according to the present disclosure. In this case, this concerns a left front side door 12 of the vehicle. In addition, a first fastening point $P_1$, which is formed by the fastening arrangement 30 according to the present disclosure, and a second fastening point $P_2$ is marked, which is explained later in further detail, which, however, is not the subject of the present disclosure. The first fastening point is situated, with respect to the installed state, at the upper end of the decorative strip 24 and the second fastening point approximately in the middle of the decorative strip 24. The decorative cover 24 is fastened to the window frame 15 via the fastening points. A third fastening point which is arranged, with respect to the installed state, at the lower end of the decorative cover and which is constructed substantially like the second fastening point $P_2$, is not illustrated.

In addition, a decorative strip 58, for example a bright strip, is fastened on the sealing part 19. The decorative cover 24 forms with the decorative strip 58 a gap 60. By means of the fastening arrangement 30 according to the present disclosure, it is possible to position the decorative cover 24 so exactly that the gap 60 runs very uniformly and the resulting gap measurement can be kept constant.

In FIG. 5 the vehicle door 10 is illustrated in perspective along the section plane A-A defined in FIG. 4. It can be seen how the L-shaped projections 34 encompass the cross-piece 42 of the second fastening element 28, whereby a form-fitting connection is produced between the first fastening element 26 and the second fastening element 28.

In FIG. 6 the vehicle door 10 is illustrated in perspective along the section plane B-B defined in FIG. 4. It can be seen that the first fastening element 26 is able to be pre-positioned on the window frame 15 by means of a punched-out and bent lug 62, which is formed by the window frame 15.1. In addition, it can be seen that the first counter surface 54 is inclined with respect to the x-y plane, so that the decorative cover 24 with respect to the z-axis owing to the movement of the decorative cover 24 along the longitudinal axis L, of the second fastening element 26 is placed into the fastening position by cooperating with the second counter surface 56.

In FIG. 7, the cut-out X of FIG. 6 is illustrated in an enlarged manner. It can be readily seen herefrom that the first and the second effective surfaces 43, 44 are inclined with respect to the y-z plane, so that the movement of the decorative cover 24 along the z-direction upwards becomes increasingly difficult starting from a particular position through a type of wedge effect and is finally prevented entirely. Consequently, the projection 34 cooperates with the second fastening element 28 not only in a form-fitting manner but also in a force-fitting manner. In addition, the lower first and second stop surfaces 46, 48, cooperating with one another, bring about a limitation to the mobility of the decorative cover 24 along the z-axis upwards.

Owing to the relatively complex geometry of the first and the second fastening element 26, 28, which also have undercuts, it is expedient to produce it from plastic. Preferably—but not exclusively—glass fiber-reinforced polyamide can be used for the fastening element 26. For example—but not exclusively—depending on the embodiment, ASA, PMMA or a material composite such as ABS-PMMA can be provided for the fastening elements 26, 28. Also, embodiment/application variants are conceivable, in particular for the second fastening element 28, which are produced by the IMD method (In-Mold Decoration) or IMC method (In-Mold Coating).

In FIG. 8 the vehicle door 10 is illustrated in perspective along the section plane C-C defined in FIG. 4. The decorative cover 24 has a base body 64, which also forms the outer surface. Furthermore, the decorative cover 24 includes in the section plane C-C in the region of a first lateral end 65 a fixing projection 66 with a first section 68, which branches off approximately perpendicularly from the base body 64, and a second section 70, which bends from the first section 68 in an angle of approximately 45°. On the second section 70, the second fastening point $P_2$ is arranged, at which the decorative cover 24 is fastened to the window frame 15. For this, a screw 72 is used as fastening means, which projects into a cavity formed by the window frame 15 and is therefore not visible from the interior of the vehicle.

Owing to the course of the fixing projection 66, an approximately C-shaped region is formed, in which the sealing part 19 is arranged. As can be readily seen from FIG. 8, the sealing part 19 has lips 74, with which the glass pane 17 is guided and sealed.

At a second lateral end 76, the base body 64 forms a U-shaped section 78, by which the decorative cover 24 encompasses a fastening projection 80 of the window frame and is therefore fixed in x-direction.

For installing the decorative cover 24, it is firstly pushed with its U-shaped section 78 onto the fastening projection 80 and is subsequently turned about the z-axis, until the second fastening element 28 cooperates in a form- and force-fitting manner at the first fastening point $P_1$ with the first fastening element 26. Hereby, the position of the decorative cover 24 relative to the window frame 15 is already brought about. The decorative cover 24 is subsequently screwed to the window frame 15 by the screws 72 at the second fastening point $P_2$ and at the third fastening point, which is not illustrated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A decorative cover for a window frame of a vehicle door comprising:
    a decorative cover configured to cover a portion of the window frame; and
    a fastener configured to position and fasten the decorative cover on the window frame, the fastener having a first fastening element associated with the window frame including first and second flexible projections with each projection having a detent, and a second fastening element associated with the decorative cover including a base body with first and second apertures separated by a cross piece, wherein the first flexible projection is received in the first aperture and the second flexible projection is received in the second aperture such that the projection capture the cross piece, the detents engage the cross piece and the first and second fastening elements cooperate in a force-fitting manner for fastening the decorative cover on the window frame.

2. The decorative cover according to claim 1, wherein the first fastening element is positionable in a single translational movement relative to the second fastening element into an installed state, wherein the first fastening element engages the second fastening element in the force-fitting manner.

3. The decorative cover according to claim 1, wherein the at least one projection comprises a first stop surface, which cooperate a second stop surface formed on the second fastening element for positioning the decorative cover on the window frame.

4. The decorative cover according to claim 1, wherein the at least one projection comprises a first effective surface, which in the installed state cooperates with a second effective surface formed on the second fastening element, wherein the first and second effective surfaces are inclined with respect to a plane running perpendicularly to a longitudinal axis of the first fastening element.

5. The decorative cover according to claim 1, wherein the first fastening element comprises a first positioning surface, which cooperates with a second positioning surface formed on the second fastening element for positioning the decorative cover on the window frame.

6. The decorative cover according to claim 5, wherein the second fastening element is arranged on a side of the decorative cover facing the window frame in the installed state.

7. The decorative cover according to claim 1, wherein the first fastening element is configured as a pre-positioned element on the window frame.

8. The decorative cover according to claim 1, wherein at least one of the first fastening element and the second fastening element comprises a plastic element, wherein the plastic is selected from the group consisting of polyamide, glass fiber-reinforced polyamide, ethylene propylene diene monomer, thermoplastic elastomers, acrylic ester-styrene-acrylonitrile, or acrylonitrile-butadiene-styrene/polymethyl methacrylate.

9. The decorative cover according to claim 1, wherein the second fastening element is formed on the decorative cover.

10. A vehicle door comprising a window frame having at least one frame member and the decorative cover according to claim 1 fastened to the frame member and covering the portion of the window frame.

11. The vehicle door according to claim 10, wherein the vehicle door is a front side door of the vehicle.

12. A vehicle comprising a vehicle body with a door having a window frame including at least one frame member and the decorative cover according to claim 1 fastened to the frame member and covering the portion of the window frame.

* * * * *